United States Patent [19]

Kaneko

[11] Patent Number: 4,717,999

[45] Date of Patent: Jan. 5, 1988

[54] IMAGE FORMING APPARATUS

[75] Inventor: Shuzo Kaneko, Tokyo, Japan

[73] Assignee: Canon Kabushiki Kaisha, Tokyo, Japan

[21] Appl. No.: 849,444

[22] Filed: Apr. 8, 1986

[30] Foreign Application Priority Data

Apr. 10, 1985 [JP] Japan ................................ 60-075894

[51] Int. Cl.[4] ........................ G01D 15/14; G03G 15/06

[52] U.S. Cl. ...................................... 346/160; 355/300

[58] Field of Search .................... 355/3 R, 3 DD, 140, 355/5; 346/153.1, 160

[56] References Cited

U.S. PATENT DOCUMENTS

| | | | |
|---|---|---|---|
| 4,391,502 | 7/1983 | Nishikawa | 355/3 DD |
| 4,493,882 | 1/1985 | Kaneko et al. | 430/97 |
| 4,541,706 | 9/1985 | Kishi | 355/3 DD X |
| 4,545,669 | 10/1985 | Hays et al. | 355/3 R |
| 4,547,787 | 10/1985 | Kaneko et al. | 346/160 |
| 4,588,990 | 5/1986 | Tamura | 340/792 |
| 4,631,559 | 12/1986 | Kaneko | 346/160 |
| 4,636,787 | 1/1987 | Kishi | 340/792 |
| 4,649,094 | 3/1987 | Tamura et al. | 430/126 |

*Primary Examiner*—Fred L. Braun

*Attorney, Agent, or Firm*—Fitzpatrick, Cella, Harper & Scinto

[57] ABSTRACT

An image forming apparatus includes an image bearing member having a conductive layer and a surface layer capable of retaining electric charge, driving device for moving the image bearing member, toner supplying device for supplying conductive or semiconductive toner to the surface layer of the image bearing member, a driver for driving the toner supplying device, electric power source for applying a bias voltage between the toner and the conductive layer of the image bearing member, and setting or control device for setting the bias voltage application to provide gradually increasing voltage at the start of the bias voltage application. The surface layer has a surface resistivity of approximately $10^{8}$–$10^{13}$ ohm/□, preferably $10^{9}$–$10^{12}$ ohm/□ and has a bulk volume resistivity of approximately $10^{10}$–$10^{16}$ ohm.cm, preferably $10^{10}$–$10^{13}$ ohm.cm.

18 Claims, 15 Drawing Figures

IMAGE FORMING APPARATUS

FIELD OF THE INVENTION AND RELATED ART

The present invention relates to an image forming apparatus for forming a toner image on an image bearing member, more particularly to an image forming apparatus usable with imaging equipment such as a copying machine, an office automation machine and an image display apparatus for producing an visible image from electric image signal generated by a electronic computer or an image reading device or image information stored or recorded in a magnetic tape or a microfilm.

Referring to FIG. 4, there is shown an image display apparatus of this type which is conventional. The apparatus comprises a photosensitive member in the form of an endless belt having a transparent and conductive base member 1*a* and a photoconductive layer 1*b*. The belt is trained around rollers 2, 2' and 2" with the transparent base member 1*a* faced inside and is rotatable by a motor M in the direction indicated by an arrow a. The developing device comprises a magnet 3 and a non-magnetic (developing) sleeve 4 enclosing the magnet 3. The conductive and magnetic toner 5 is carried on the sleeve 4, while being attracted by the magnetic force of the magnet 3. The toner 5 is contacted to the outer periphery of the photosensitive member 1. Between the base plate 1*a* and the toner carrying sleeve, an electric field is formed by a DC voltage so that if the photoconductive layer 1*b* is of N type semiconductor, the base member 1*a* is connected to the negative side, whereas if the photoconductive layer 1*b* of P type semiconductor, the base member 1*a* is connected to positive side. The photoconductive layer 1*b* is exposed to a laser beam 7' through the base member 1*a* at a position where it is contacted with the toner 5. By this, the toner 5 is deposited on the surface of the photoconductive layer 1*b* at the area exposed to the laser beam. This process is disclosed in Laid-Open Japanese Patent Application No. 98746/1983. Referring to FIG. 5, there is shown a schematic view of this apparatus, wherein a laser beam which is an output beam of a semiconductor laser 7 modulated in accordance with the electric signal corresponding to the image to be displayed, is deflected in a direction perpendicular to the sheet of the drawing by a scanner 8 comprising galvano mirror or a polygonal mirror. The laser beam is directed to the back surface of the photosensitive belt 1 through an $f-\theta$ lens 9 and a mirror 10. Those elements 7, 8, 9 and 10 are disposed inside the photosensitive member 1. As for the exposure means, an LED (light emitting diode) array and a liquid crystal shutter array may be used. The photosensitive member 1 moves in the direction of the arrow a in FIGS. 4 and 5. The photosensitive member comprises a transparent polyethyleneterephthalate film (base member 1*a* ) which has been made conductive by providing on its surface indium oxide thin film and a photoconductive layer 1*b* on which surface of photoconductive material including CdS and resin as a binder. The CdS material is sensitive to near-infrared light produced by the semiconductor laser 7 by the doping of copper and indium. Opposed to the exposure station where the photosensitive member 1 is exposed to the laser beam 7', the developing device 12 is located outside of the photosensitive member 1. The magnet inside the stationary non-magnetic sleeve 4 is rotatable in the direction of an arrow b by a motor M in FIGS. 4 and 5.

The conductive and magnetic toner 5 deposited on the outside surface of the sleeve 4 moves along the surface of the sleeve 4 in the direction opposite to the direction b of rotation of the magnet 3. During this movement, the toner particles are regulated by the blade 6 as a layer having uniform thickness and then brought into contact with the surface of the photosensitive member 1. Between the base member 1*a* of the photosensitive member 1 and the sleeve 4, the above described DC voltage is applied. Therefore, between the light area which has received the laser beam 7' and the dark area which has not received the laser beam, there is a great difference in the electrostatic attraction force between the electric charge induced by the voltage to the toner particles contacted to the surface of the photosensitive member 1 and the electric charge of the photosensitive member having the opposite polarity. As a result, an image is formed by the contact and non-contact of the toner to the surface of the photosensitive member depending on whether the photosensitive member is exposed to the laser beam 7' or not, whereby the image is developed. The length of the photosensitive member of the area where it is contacted to the toner particles 5 is much greater when compared with the incident spot of the laser beam 7' onto the photosensitive member 1. Therefore, the development by the toner deposition onto the surface of the photosensitive member continues even after termination of the exposure by the laser beam 7'. Adjacent the position where the image exposure and development are effected, there are disposed a couple of rollers 11 and 11', thereby maintaining the flatness of the surface of the photosensitive member 1, whereby the clearance between the developing device 12 and the sleeve 4 remain constant with high accuracy.

The toner image formed on the surface of the photosensitive member 1 at a position opposed to the developing device 12 is conveyed to the display station 13 by movement of the photosensitive member 1, where the movement of the photosensitive member 1 is stopped. At this display station 13, the operator can observe the toner image formed on the surface of the photosensitive member through the glass 13'.

Lamps 14 and 15 are effective to illuminate the surface of the photosensitive member 1 to make the observation easier, and also to erase the hysteresis of the photosensitive member 1 produced by the electric field during the image forming step. A lamp 16 is provided in order to erase the hysteresis of the photosensitive member 1 and is turned on only during the movement of the photosensitive belt 1 and is turned off together with the stoppage of the belt.

When the content of the display is renewed, the photosensitive belt 1 is moved again so that the photosensitive member carrying the toner image formed in the previous image forming step is brought to the exposure and developing station without cleaning. By this, the previous toner image is erased, and simultaneously, the next toner image is formed.

As shown in FIG. 5, it is possible that an additional thin film 1*c* is formed on the photoconductive member, the thin film having a suitable electric resistance and having white color.

The developing roll has been described as a combination of a stationary non-magnetic sleeve 4 and a magnet 3 rotatable therein. However, it is possible that the sleeve 4 is moved codirectionally with the photosensitive member 1, and the magnet 3 is fixed, and further alternatively, both of them may be rotated. In any event, the brush of the toner particles are contacted to the photosensitive member 1 within a certain contact range.

The image forming apparatus for image display of the type wherein the image to be displayed is formed as a toner image on an image bearing member having a photoconductive member, is advantageous in that the resolution is better than CRT display device or a liquid crystal display device, that it is easy to observe the image with less fatigue, and that it is easy to obtain a hard copy by adding a mechanism for transferring onto a copy sheet the toner image formed on the belt surface, if necessary.

However, a disadvantage has been found by the inventor that sometimes an unclear background in the form of a stripe occurs in the displayed image.

SUMMARY OF THE INVENTION

Accordingly, it is a principal object of the present invention to provide an image forming apparatus wherein the occurrence of the unclear image described above, is prevented, and wherein the possible electrostatic break-down resulting from the bias voltage application to the image bearing member is prevented, in an apparatus which forms an image on a photosensitive member or an image bearing member.

According to an embodiment of the present invention an image forming apparatus is provided, which comprises an image bearing member having a conductive layer and a surface layer capable of retaining electric charge, driving means for moving the image bearing member, toner supplying means for supplying conductive or semiconductive toner to the surface layer of the image bearing member, means for driving the toner supplying means, electric power source for applying a bias voltage between the toner and the conductive layer of the image bearing member, and setting means for setting the bias voltage application to provide gradually increasing voltage at the start of the bias voltage application.

As for the surface layer of the image bearing member, a photoconductive layer, a high resistance layer or an insulating layer are usable. The image formation on the image bearing member can be effected by application of image light to the image bearing member and voltage application using a stylus electrode.

As for the setting means, an electric circuit for reducing the rising period of the bias voltage or reducing the speed of the image bearing member in accorance with the rising time, or a driving mechanism for setting the speed of the image bearing member movement in consideration of the rising period may be used. The setting means is effective to reduce the amount of the charge retained by the toner so as to prevent the toner from depositing on the image bearing member as a result of the increase of the toner charge amount by the application of the bias voltage beyond a certain level.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are graphs illustrating operation of the DC voltage application means in the image forming apparatus according to an embodiment of the present invention, wherein FIG. 1A shows the voltage rising, and FIG. 1B shows the change of the amount of charge retained by the toner.

FIGS. 2A, 2B and 2C illustrate an example of the structure and operation of the electric circuit for applying the DC voltage, wherein FIG. 2A is a block diagram, FIG. 2B is a circuit diagram and FIG. 2C illustrates the pre-run period from the start of the voltage application.

FIGS. 3A and 3B illustrate another embodiment of the DC voltage application means, wherein FIGS. 3A is a circuit diagram, and FIG. 3B shows the rising of the applied voltage.

FIGS. 5–8 illustrate the principle of the development to form the toner image on the photosensitive member, wherein FIG. 5 is an enlarged partial sectional view illustrating the relationship among the developing sleeve, the toner and the photosensitive member, FIG. 6 shows the equivalent circuit of the device shown in FIG. 3A, FIG. 7 illustrates the relationship between the time period of contact between the photosensitive member and the toner and the point of exposure time by the output beam, FIG. 8 is a graph showing the change of the toner charge amount during the time of contact between the photosensitive member and the toner.

FIGS. 9A and 9B illustrate the DC voltage applying means in a conventional image forming apparatus, wherein FIG. 9A shows the stepwise increase of the applied voltage, and FIG. 9B shows the change of the charge amount retained by the toner.

DETAILED DESCRIPTION OF THE PREFERRED EMBODIMENTS

Figure 5:
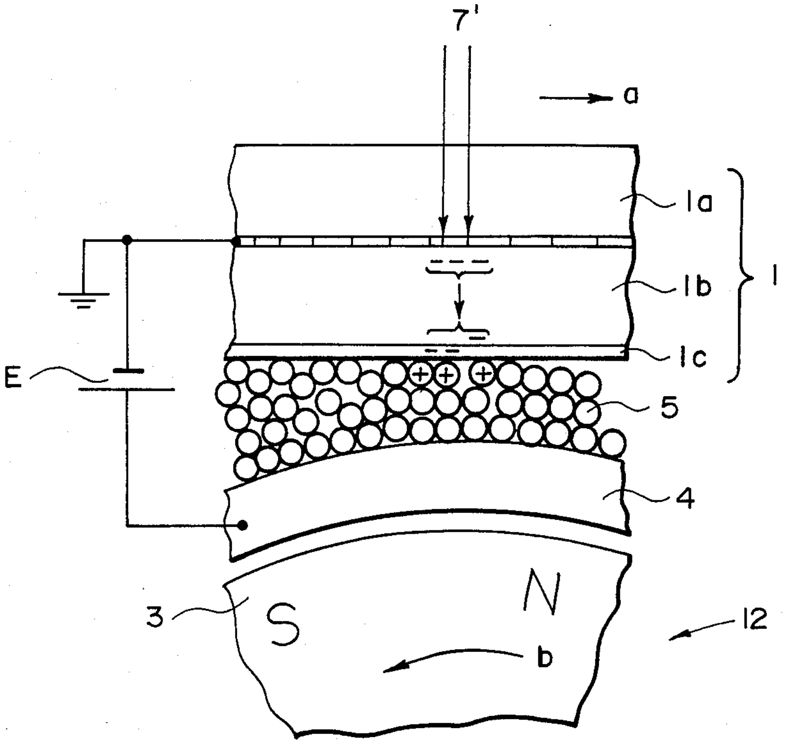
Figure 6:
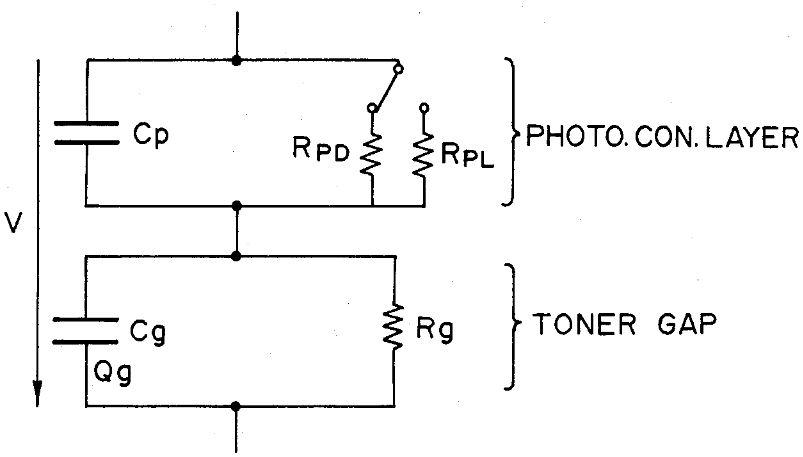
Figure 7:
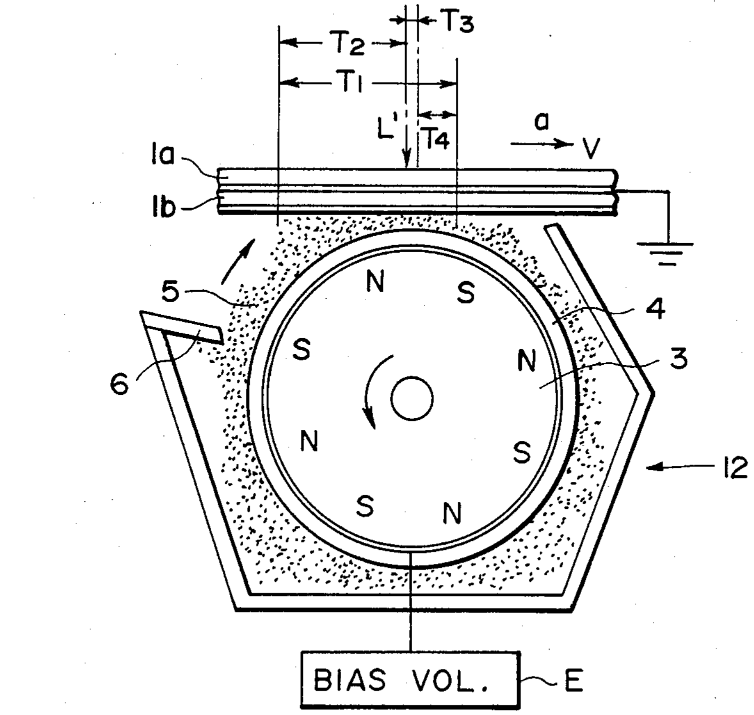
Figure 8:
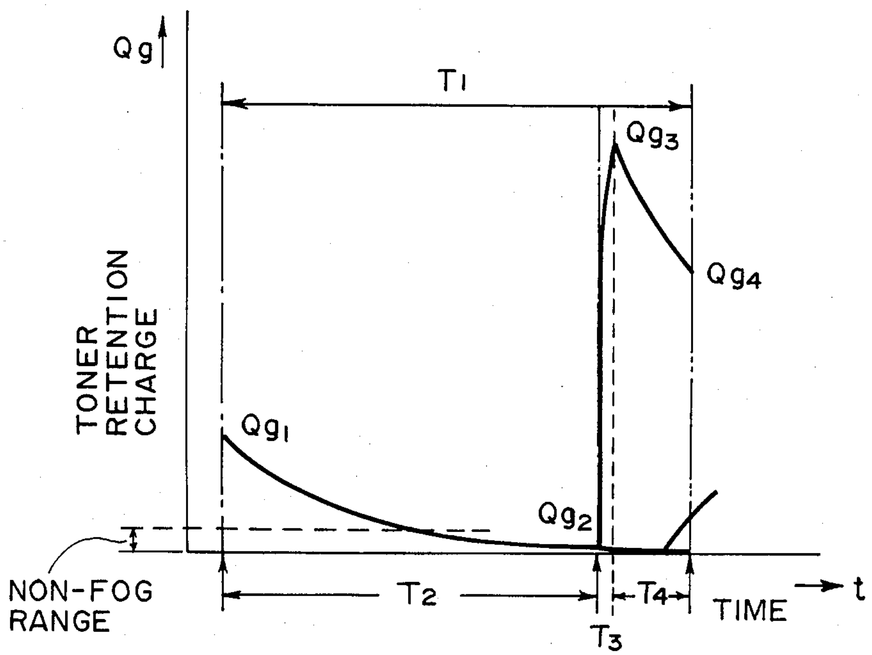

FIGS. 6, 7 and 8 illustrates the principle of the image formation of the apparatus of FIG. 5. FIG. 6 shows an equivalent circuit consisting of an electrostatic capacity C and the electric resistance R connected to constitute a CR circuit, which circuit corresponds to the photosensitive member 1 and the toner 5 contacted to the surface of the photosensitive member 1. In this equivalent circuit, Cp is an electrostatic capacity of the photoconductive layer 1*b;* RPD and RPL are dark resistance and light resistance of the photoconductive layer $1_b$; Cg is an electrostatic capacity of the small clearance between the toner 5 and the photoconductive layer 1*b*; and Rg is resistance of the small clearance. When the photosensitive member 1 is exposed to the laser beam 7' in the equivalent circuit of FIG. 6, the photoconductive layer 1*b* is switched from the dark resistance $R_{PD}$ to the light resistance $R_{PL}$ due to its photoconductive property, so that the resistance reduces. In this Figure, Qg is the amount of electric charge produced in the toner contacted to the photoconductive layer 1*b*, and the amount of the charge Qg decreases with elapse of time of contact with the photoconductive layer 1*b* by leaking.

In FIG. 7, T1 is the time from the start of contact of the toner 5 to the photoconductive layer 1*b* of the photosensitive member moving in the direction of the arrow a at a speed V to the disengagement thereof from the photoconductive layer 1*b*; T2 is the time from the start of the contact to the start of the exposure thereof to the laser beam 7′; T3 is a steep rising time of the toner charge amount Qg by the exposure; and T4 is the time from the end of the time T3 to the toner 5 disengaging from the photoconductive layer 1*b*. Therefore, $T1=T2+T3T4$.

FIG. 8 illustrates the change of the amount of the electric charge of the toner Qg explained with FIG. 7, during the developing time period T1, where the ordinate represents the amount of the charge Qg of the toner, and the abscissa represents the time t.

As will be understood from the explanation with FIGS. 5 to 8, when the photoconductive layer 1*b* of the photosensitive member 1 contacts the toner 5, the amount of the toner charge Qg is $Qg_1$ at the time of the start of the contact and decreases to the level $Qg_2$ toward the time T2. Here, it rapidly increases to the level $Qg_3$ for the short period of time T3 by the exposure to the laser beam 7′. Then, after the elapse of time T4, the toner is disengaged from the photosensitive member, and the level decreases to the level $Qg_4$. The reason why the amount of the charge of the toner decreases from $Qg_1$ to $Qg_2$, or it decreases from $Qg_3$ to $Qg_4$, is that the capacity leaks by the continued contact of the toner 5 and the photoconductive layer 1*b*. The reason why it rapidly increases from $Qg_2$ to $Qg_3$ is that the resistance of the photoconductive layer 1*b* rapidly decreases from $R_{PD}$ to $R_{PL}$ by the application of the laser beam 7′ to the photoconductive layer 1*b* at the exposure position.

In the above described process, the degree of the electrostatic attraction between the toner and the photosensitive member depends on the amount of the toner charge Qg at the end of the contact between the toner 5 and the photosensitive member 1 in FIG. 5. For example, in the non-exposure area, if the charge amount Qg at the end of the contact with the photosensitive member is too large, the toner is contacted to the photosensitive member surface by the electrostatic attraction, resulting in an image having a foggy background.

The electrostatic attraction applied to the toner is proportional to the square of the amount of the electric charge Qg of the toner. The deposition of the toner to the photosensitive member 1 is determined depending on the electrostatic attraction, the magnetic attraction force by the developing roller and the separation force by the moving toner brush.

Figure 4:
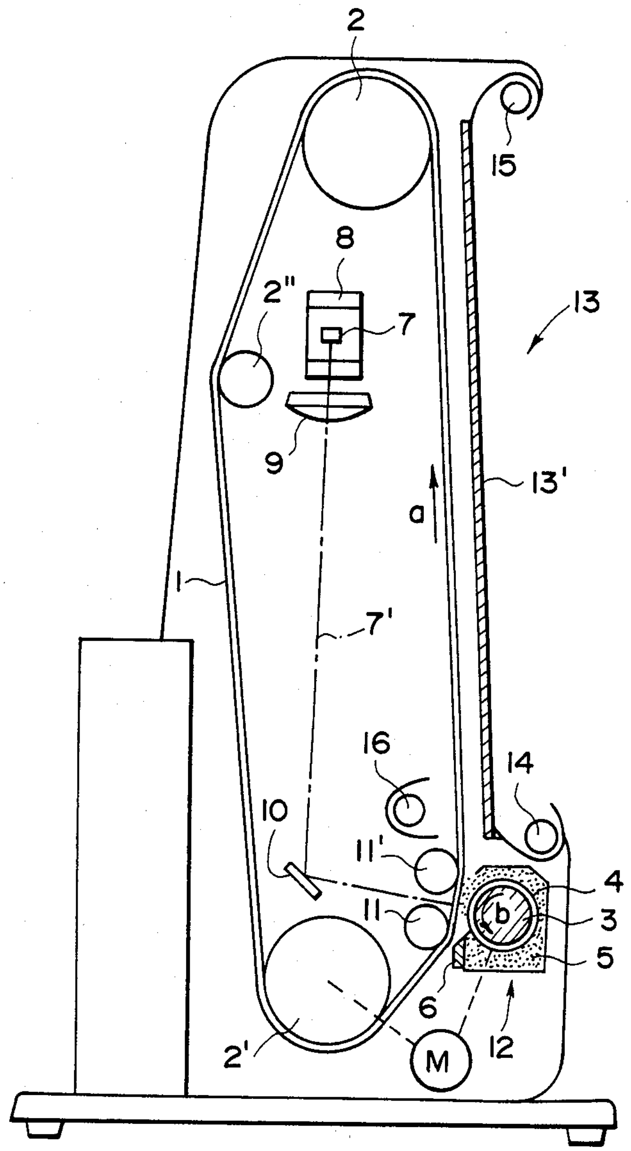
FIG. 4 is a sectional view illustrating the general arrangement of the image forming apparatus to which the present invention is applicable.
Figure 9A:
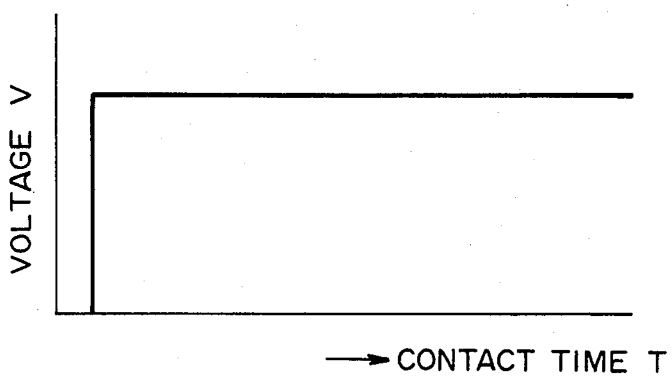
Figure 9B:
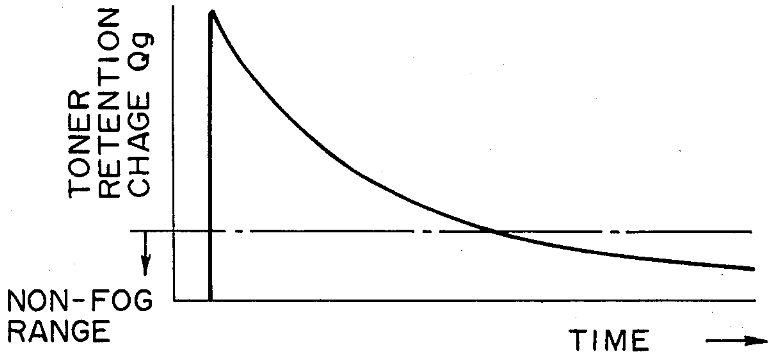

In the above-described image formation and developing process, the DC voltage is applied between the developing device and the photosensitive member. Conventionally, the DC voltage has been stepwise as shown in FIG. 9A. Therefore, the amount of the electric charge Qg of the toner contacted to the photosensitive member rises at once beyond the range within which the fog is not produced, as shown in FIG. 9B. Then, it decreases toward the non-fog range with time. In the area where the time required for the toner in the contact area to disengage from the photosensitive member is short, the amount of the charge Qg does not decrease sufficiently into the non-fog range, so that the toner in the area is deposited to the photosensitive member resulting in a fog in the form of a stripe. Particularly in the case of the image display device shown in FIG. 4, the fog passes by the display station 13.

Further explanation will be made as to principle of the developing process in this type of apparatus referring to FIGS. 5–8.

The magnitude of the electrostatic attraction force of the toner in the developing step depends on the amount of the charge Qg at the termination of the contact between the toner and the photosensitive member. For example, even in the non-exposed area of the photosensitive member, the toner is deposited on the photosensitive member by the electrostatic attraction force if the amount of charge Qg is too large, resulting in the foggy background.

In order to control the amount of the charge, the properties of the contact gap (electrostatic capacity Cg and the electric resistance Rg) between the toner and the photosensitive member surface should be considered. When the conductive toner is used, the passage of the charge (charging and discharging of the toner) through the contact gap during the developing operation (contact) can not be neglected, and the behavior of the charge at this point of time as shown in FIG. 8 greatly influences the developing characteristics.

The change of the charge Qg with time in the non-exposed area (dark area), is determined by the divided voltage between the capacities Cg and Cp in this equivalent circuit at the instance of the contact of the toner to the photosensitive member, more particularly, $Qp=Qg=(Cg\times Cp)V/(Cg+Cp)$; and is determined by the divided voltage between the resistances Rg and Rpd if the period of contact is long enough, more particularly, $Qg=(Cg\times Rg)V/(Rp+Rg)$. The change of behavior with time of the amount of charge Qg during contact is determined by the comparison between the time constant of the contact gap and the time constant of the photosensitive member. For example, if $Cg\times Rg<Cp\times Rpd$, it is decreasing function (discharging), and if $Cg\times Rg>Cp\times Rpd$, it is increasing function (charging). The former is preferable from the standpoint of prevention of the foggy background, and it is preferable that the period of contact T2 between the toner and the photosensitive member is longer.

In the case where the photosensitive member is exposed to light (light portion) at a point of time T2 after the start of the contact, the amount of charge rapidly increases from the instance of the exposure for the period of time T3. During this, the resistance of the photosensitive member is $R_{pL}$, and if the resistance is maintained for a long period of time, the charge Qg is determined by the divided voltage between the resistance Rg and the resistance $R_{pL}$. However, since the duration of the laser beam exposure is very short, the photosensitive member, if not having the light hysteresis, is rapidly increased in the resistance, and it returns to Rpd. Therefore, the amount of charge Qg which has rapidly increased after the exposure returns to the dark portion level for the period of time T4. Here, if the time constant of the contact gap $Cg\times Rg$ is very small, the amount Qg becomes too small in the time period T4. The time constant of the contact gap and that of the photosensitive member should not be too large.

This applies to the case where the surface layer is provided. In this process, in order to decrease the consumption of the toner and to simplify the structure of the apparatus, no particular cleaning means is provided for the purpose of removing the toner image from the photosensitive member, but the magnetic force of the magnet 3 at the developing station is effective to clean the photosensitive member during the developing operation, in this embodiment. Therefore, when the developing operation is repeated, the ghost image can results if the charge of the previous operation remains on the photosensitive member. Accordingly, in order to provide a high contrast and good image, it is necessary that appropriate characteristics of the photosensitive member and the contact gap and that the period of contact and the timing of the exposure are properly determined.

In the equivalent circuit, the characteristics of the bulk of the toner and the characteristics of the surface layer are neglected for the sake of simplicity. That is, it is assumed that the surface layer is sufficiently thin as compared with the photosensitive layer, and the capacity thereof is sufficiently large, and the toner has sufficiently low resistance. However, it is preferable to pay consideration to the surface resistance of the surface layer and the resistance of the toner, since they influence the property, particularly Rg, of the contact gap.

The property of the surface of the image bearing member (photosensitive member in this embodiment) is preferably $10^8$-$10^{13}$ ohm/□, more preferably, $10^9$-$10^{12}$ ohm/□ of the surface resistivity; and the property of the bulk of the surface layer is preferably $10^{10}$-$10^{13}$ ohm.cm of the volume resistivity, 5-200 of the dielectric constant, and 2-20 microns in the thickness, more preferably 2-15 microns in the thickness.

The toner is conductive or semiconductive, and preferably has the resistance of $10^3$-$10^8$ ohm.cm in order to obtain the most preferable image contrast.

As for the photoconductive layer of the photosensitive member, the above-described CdS is usable, and in addition, organic photoconductor (OPC) or other conductive members are usable.

The preferable dielectric constant is 2-10, more preferably 2-5; and the dark resistance thereof is $10^{10}$-$10^{16}$ ohm.cm, more preferably $10^{11}$-$10^{15}$ ohm.cm, and the thickness thereof is preferably 15-100 microns. When the capacity of the photosensitive member is too large, or when the dark resistance is too small, the background fog can appear. When resistance is too large, a sufficient amount of charge might not be obtained by the exposure at certain times.

As described hereinbefore, if the voltage is applied stepwisely before the contact area between the toner brush and the photosensitive member reaches the imaging area, the foggy background in the form of a stripe is produced. The density thereof is high in the portion downstream of the contact area between the toner and the photosensitive member. This is because, as shown in FIG. 9, such area terminates the contact without sufficient contact period of time from the instance of the voltage application start, so that at the termination of the contact, the toner has the amount of the charge Qg which is beyond the non-foggy range.

Figure 1A:
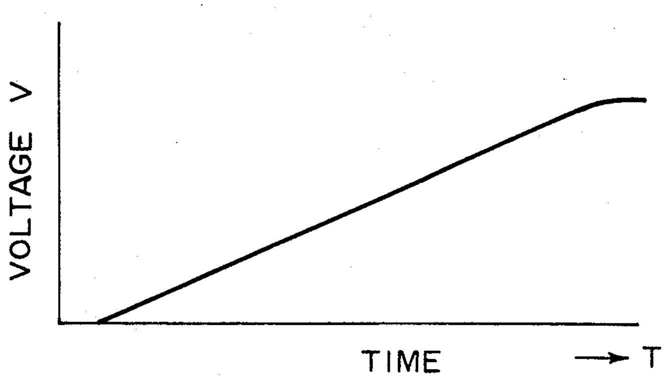
Figure 1B:
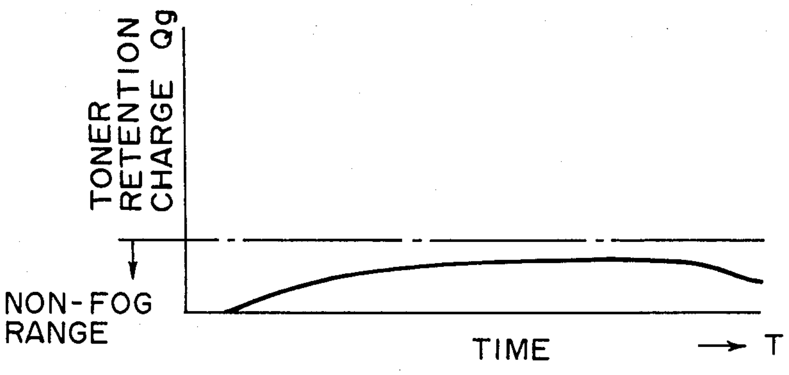

In order to solve this problem, according to the present invention, at the start of the voltage application, the voltage gradually increases as shown in FIG. 1A. By doing so, it is possible, as shown in FIG. 1B, that the amount Qg of the charge of the toner can be within the non-foggy range. The amount Qg of the charge is mainly determined by the magnetic force of the developing roller so as to be within the non-foggy range. At this time, the photosensitive member may be stationary.

The voltage rising period is preferably substantially equal to the length of the contact between the toner and the photosensitive member divided by the process speed of the photosensitive member in order to sufficiently reduce the foggy stripe. This effect is increased with the length of the rising time period. Therefore, it is preferable that the rising time period of the applied voltage is as long as possible within the period of time from the start of the voltage application to the edge of the imaging area being reached.

Figure 2A:
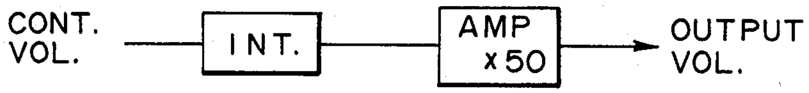
Figure 2B:
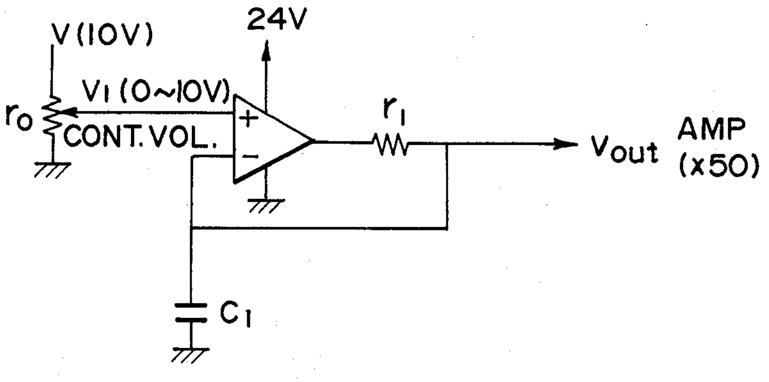
Figure 2C:
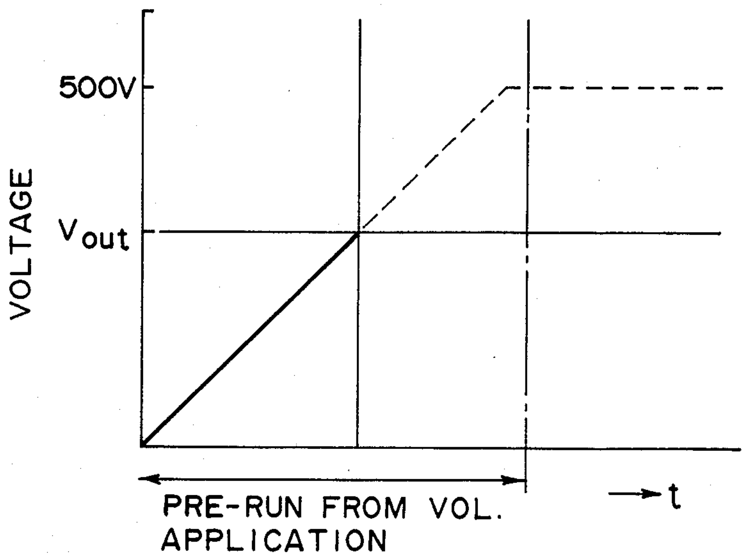

FIGS. 2A, 2B and 2C illustrate the structure and operation of an example of an electric circuit for applying the DC voltage. In this circuit, an operation amplifier is used as a comparator, wherein the coefficient of the voltage rising (inclination) is determined by r1 and c1, so that the inclination of the output voltage Vout is constant irrespective of the control voltage V1. In this example, this is amplified to be 50 times by the amplifier. When the voltage is applied, the pre-run period from the voltage application is set to be longer than the time period required to reach the maximum voltage, and the rising period of time to the voltage to be applied is set to be longer than the time required for the photosensitive member to pass the contact area between the toner and the photosensitive member.

Figure 3A:
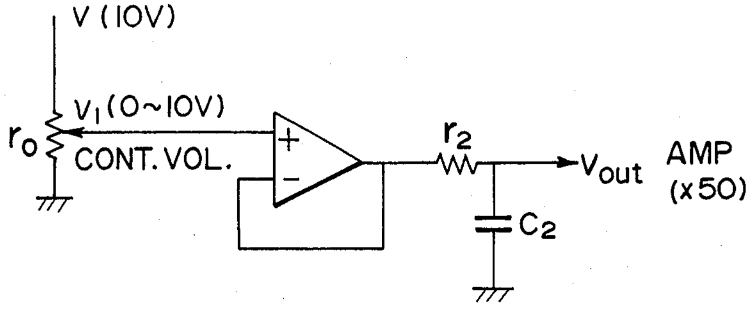
Figure 3B:
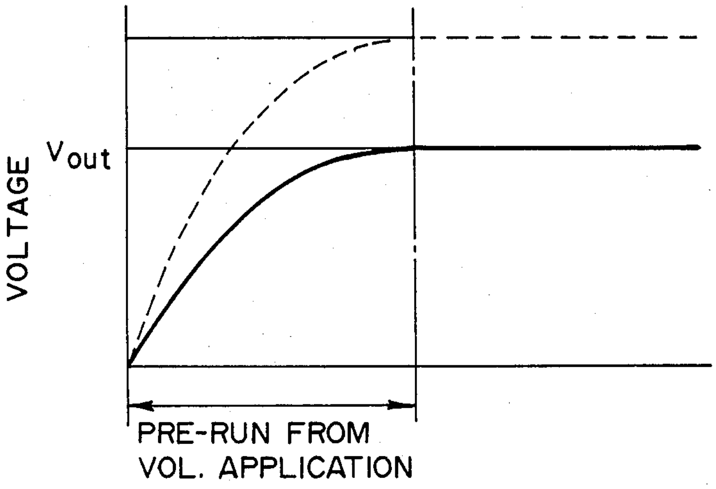

It is a possible alternative, as shown in FIGS. 3A and 3B, the rising period of time is made constant by an ordinary integrating circuit irrespective of the control voltage. In this case, the pre-run period is made longer than the rising period of the applied voltage.

Here, the rising period is the period required for the voltage to reach 90% of the intended voltage.

The photosensitive member usable with the present invention comprises, for example, a transparent conductive base plate having a polyethylene terephthalate film coated with ITO and 60 microns thickness of a bound layer of copper and indium doped CdS, and a surface layer of bound layer $TiO_2$. Opposed to the surface layer of the photosensitive member, a developing roller having the diameter of 32 mm is disposed with the smallest clearance of 250 microns. Within the developing roller, 8-pole magnet (4 S poles and 4 N poles) is disposed which provides 800 Gauss of the maximum magnetic field at the surface of the developing roller. The magnet rotates in the same peripheral direction as of the photosensitive member at a speed of 1200 r.p.m. The process speed of the photosensitive member is 180 mm/sec. The length of the contact area between the toner and the photosensitive member measured along the movement of the photosensitive member is approximately 15 mm. When the DC voltage reaching to 250 V is applied stepwisely to stepwisely increase the voltage, stripe fog results.

It has been confirmed that the voltage is increased to 250 V in 90 mm/sec., the density of the fog is fairly decreased, and that when it is increased in approximately 200 mm/sec., there occurs hardly any fog. In this device, the pre-run length is approximately 40 mm from the start of the voltage application to the developing device to the leading edge of the image reaching the developing position, and approximately 220 mm/sec. is required to the start of the development.

The toner used has the volume resistivity of approximately $10^5$ ohm.cm and contains 55 wt. % ferrite particles in the resin.

The present invention is applicable not only to the photosensitive member but also to the insulating or high resistance layer having the above-described surfact resistivity, and more preferably the other surface properties, the same as those described with respect to the photosensitive member, which may be used in place of the photosensitive member in the area where the voltage starts to be applied.

In place of the sensitivity-increased CdS in the photosensitive member, non-sensitivity-increased CdS or ZnO or a polyester film may be used.

Figure 10:
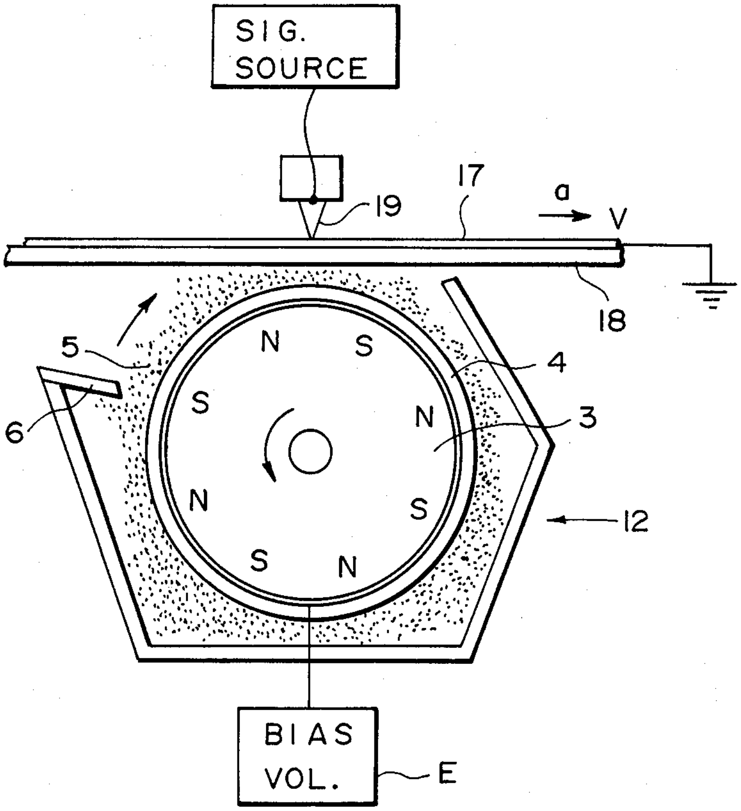
FIG. 10 is a sectional view of a part of the apparatus according to another embodiment of the present invention.

The present invention is applicable to the image forming process wherein the image light application is not used, but as shown in FIG. 10, the image bearing member is constructed by a conductive layer 17 and a surface insulating layer 18, and a known stylus electrodes 19 are disposed adjacent to the side opposite to the side where the toner is supplied to the image bearing member. In this case, the image is formed on the image bearing member by independent stylus electrodes 19 arranged in the longitudinal direction to which the voltage is applied to form the charge pattern, which in turn is developed by the toner 5.

As will be apparent from the foregoing explanation, according to the present invention, the image bearing member is not developed to an unnecessary extent, and the foggy background can be reduced or minimized, and furthermore, the possibility of the dielectric breakdown of the image bearing member such as a photosensitive member by the sudden increase of the voltage can be prevented effectively.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

an image bearing member having a conductive layer and a surface layer capable of retaining electric charge;

driving means for moving said image bearing member;

toner supplying means for supplying toner having a low electrical resistance to said surface layer of said image bearing member;

means for driving said toner supplying means;

electric power source for applying a bias voltage between the toner and the conductive layer of said image bearing member; and setting means for setting the bias voltage application to provide gradually increasing voltage at the start of the bias voltage application.

2. An apparatus according to claim 1, wherein said surface layer has a surface resistivity of approximately $10^8$–$10^{13}$ ohm/□, preferably $10^9$–$10^{12}$ ohm/□ an has bulk volume resistivity of approximately $10^{10}$–$10^{16}$ ohm.cm, preferably $10^{10}$–$10^{13}$ ohm.cm.

3. An apparatus according to claim 1, wherein said image bearing member moves at the start of the bias voltage application.

4. An apparatus according to claim 1, wherein said setting means sets a rising period at the start of the bias voltage application to be not less than a period required for said image bearing member to move a predetermined distance.

5. An apparatus according to claim 4, wherein said information light is a modulated laser beam.

6. An apparatus according to claim 1, wherein said surface layer is an electrically insulating layer.

7. An apparatus according to claim 1, wherein said surface layer is a high electric resistance layer.

8. An apparatus according to claim 1, wherein said surface layer is an electrophotographic photosensitive member.

9. An apparatus according to claim 8, wherein said photosensitive layer is or organic photoconductive material, and has a dielectric constant of 2–10, preferably 2–5 and has a thickness of 15–100 microns.

10. An apparatus according to claim 8, wherein said photosensitive layer has a dielectric constant of 5–200, and has a thickness of 2–20 microns, preferably 2–15 microns.

11. An apparatus according to claim 1, wherein said image bearing member has an electrophotographic photosensitive layer, and the image is formed thereon by application of information light.

12. An apparatus according to claim 1, wherein said image bearing member has a charge retaining layer, and the image is formed corresponding to electrostatic charge provided by a recording electrode.

13. An apparatus accordnig to claim 1, wherein said setting means is effective to continuously and gradually increase the bias voltage at an initial stage of its application.

14. An apparatus according to claim 1, wherein said setting means is effective to increase the bias voltage in small increments.

15. An apparatus according to claim 1, wherein said setting means sets a pre-run period larger than a period in which the bias voltage reaches its maximum.

16. An apparatus according to claim 1, wherein said image forming apparatus includes an optical opening for displaying the toner image formed on said image bearing member.

17. An apparatus according to claim 1, wherein the toner is conductive.

18. An apparatus according to claim 1, wherein the toner is semiconductive.

* * * * *

UNITED STATES PATENT AND TRADEMARK OFFICE
CERTIFICATE OF CORRECTION

PATENT NO. : 4,717,999

DATED : January 5, 1988

INVENTOR(S) : SHUZO KANEKO

It is certified that error appears in the above-identified patent and that said Letters Patent is hereby corrected as shown below:

SHEET 7, FIG. 9B,
"CHAGE" should read --CHARGE--.

COLUMN 1
Line 11, "an" should read --a--.
Line 12, "a" should read --an--.
Line 34, "lb of" should read --lb is of--.
Line 35, "positive" should read --the positive--.
Line 51, "belt" should read --member--.
Line 61, "of" should read --is--.

COLUMN 2
Line 53, "belt 1" should read --member 1--.
Line 54, "belt" should read --member--.
Line 56, "belt 1" should read --member 1--.

COLUMN 3
Line 26, "above," should read --above--.
Line 54, "accorance" should read --accordance--.

COLUMN 4
Line 16, "FIGS. 3A" should read --FIG. 3A--.
Line 45, "illustrates" should read --illustrate--.
Line 54, "RPD and RPL" should read --$R_{PD}$ and $R_{PL}$--.

UNITED STATES PATENT AND TRADEMARK OFFICE
CERTIFICATE OF CORRECTION

PATENT NO. : 4,717,999
DATED : January 5, 1988
INVENTOR(S) : SHUZO KANEKO

It is certified that error appears in the above-identified patent and that said Letters Patent is hereby corrected as shown below:

<u>COLUMN 5</u>

Line 11, "T1=T2+T3T4" should read --T1=T2+T3+T4--.

<u>COLUMN 6</u>

Line 3, "principle" should read --the principle--.

<u>COLUMN 7</u>

Line 4, "results" should read --result--.
Line 46, "stepwisely" should read --stepwise--.

<u>COLUMN 8</u>

Line 24, "the rising" should read --that the rising--.
Line 49, "stepwisely to stepwisely" should read --stepwise to stepwise--.
Lines 50-51, "results.¶It" should read --results. It--.
Line 65, "surfact" should read --surface--.

<u>COLUMN 9</u>

Line 54, "an has" should read --and has a--.

<u>COLUMN 10</u>

Line 21, "or organic" should read --of organic--.

UNITED STATES PATENT AND TRADEMARK OFFICE
CERTIFICATE OF CORRECTION

PATENT NO. : 4,717,999
DATED : January 5, 1988
INVENTOR(S) : SHUZO KANEKO

It is certified that error appears in the above-identified patent and that said Letters Patent is hereby corrected as shown below:

COLUMN 10

Line 36, "accordnig" should read --according --.

Signed and Sealed this

Thirteenth Day of September, 1988

*Attest:*

DONALD J. QUIGG

*Attesting Officer*

*Commissioner of Patents and Trademarks*